United States Patent
Klosterman

(10) Patent No.: US 7,202,961 B2
(45) Date of Patent: Apr. 10, 2007

(54) METHOD FOR DYNAMICALLY CREATING A PRINTER DRIVER

(75) Inventor: Elliot Lee Klosterman, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 905 days.

(21) Appl. No.: 09/871,751

(22) Filed: Jun. 1, 2001

(65) Prior Publication Data

US 2002/0181011 A1 Dec. 5, 2002

(51) Int. Cl.
*G06F 3/12* (2006.01)
*G06F 3/14* (2006.01)

(52) U.S. Cl. .................. 358/1.15; 358/1.15; 358/1.16; 710/10; 719/321; 719/327

(58) Field of Classification Search ................ 358/1.1, 358/1.15, 1.18, 1.16; 395/112, 114; 345/418; 719/321, 327; 710/10
See application file for complete search history.

(56) References Cited

U.S. PATENT DOCUMENTS

| | | | | |
|---|---|---|---|---|
| 5,228,118 A | * | 7/1993 | Sasaki | 358/1.13 |
| 5,659,336 A | * | 8/1997 | Patrick et al. | 345/545 |
| 5,852,744 A | | 12/1998 | Agatone et al. | 395/837 |
| 6,139,177 A | | 10/2000 | Venkatraman et al. | 364/188 |
| 6,170,007 B1 | | 1/2001 | Venkatraman et al. | 709/218 |
| 6,523,696 B1 | * | 2/2003 | Saito et al. | 709/223 |
| 6,707,568 B1 | * | 3/2004 | Yu | 358/1.15 |
| 6,804,019 B2 | * | 10/2004 | Shiohara | 358/1.15 |

* cited by examiner

*Primary Examiner*—Kimberly Williams
*Assistant Examiner*—Peter K Huntsinger

(57) ABSTRACT

A method and system for dynamically creating a driver on a host computer for a peripheral device. The dynamically created driver is compatible with any selected peripheral device on a network.

18 Claims, 3 Drawing Sheets

_US 7,202,961 B2_

METHOD FOR DYNAMICALLY CREATING A PRINTER DRIVER

BACKGROUND OF THE INVENTION

1. Field of the Invention

This invention relates to printer drivers and, in particular, to a system, method, and apparatus for dynamically creating a printer driver as part of the printing process.

2. Related Art

Personal computers are widely used to print documents containing text, graphics and images. Personal computers in offices are typically connected together using network technologies, which incorporate one or more printers in the network architecture. Typically, the printers can be shared by the plurality of personal computers connected to the network.

Preparing the computer generated document for printing requires several operations performed typically by printer driver software normally included on the computers. Computers arranged in the network usually include various types of printer driver software, which are compatible with or applicable to respective language interpreters available on the various types of printers in the network. In the network environment, the operator of each computer is required to select one of the printer drivers, which is applicable to one of the language interpreters on one of the printers. This selection must be made, for example, when a change is made from one type of printer to another or when new software is set on the computer.

Unfortunately, the selection of the appropriate printer driver can be a cumbersome and time-consuming process. The process can be further frustrated when the appropriate printer driver has not been set in the computer. Moreover, since the number of printers in a network can be large, the amount of printer driver software that may be required reduces the memory storage space available.

SUMMARY

The present invention addresses the foregoing by providing a system, method and apparatus, which can dynamically create a driver for a peripheral device on a host device. The dynamically created driver is compatible with any selected peripheral device on the network. The method, system and apparatus minimize the need for space consuming driver software being resident on the host device, which increases available storage memory storage and improves the performance of the host device during the printing process.

In one aspect, a printing system is provided including a host module for initiating a communication from a host device, where the host module includes a first program. A rendering module is disposed in a peripheral device and is provided to the host device in response to the communication. The first program and the rendering module are used cooperatively to control the peripheral device.

In another aspect, a method is provided for dynamically creating a driver including initiating a communication from a host device to a peripheral device, where the host device includes a first program logic; and receiving a response to the communication, which includes a second program logic; and driving the peripheral device cooperatively using the first program logic and the second program logic.

In another aspect, an apparatus is provided having a processor for executing instructions to perform a method of dynamically creating a driver. The method includes receiving a communication from a host device, where the host device includes a first program logic. The method further includes transmitting a response to the communication, where the response includes a second program logic. The first program logic and the second program logic are performed cooperatively to drive the apparatus.

This brief summary has been provided so that the nature of the invention may be quickly understood. A more complete understanding of the invention can be obtained by reference to the following detailed description of embodiments thereof in connection with the attached drawings.

BRIEF DESCRIPTION OF THE DRAWINGS

The use of the same reference symbol in different figures indicates the same or identical elements.

DETAILED DESCRIPTION

Figure 1:
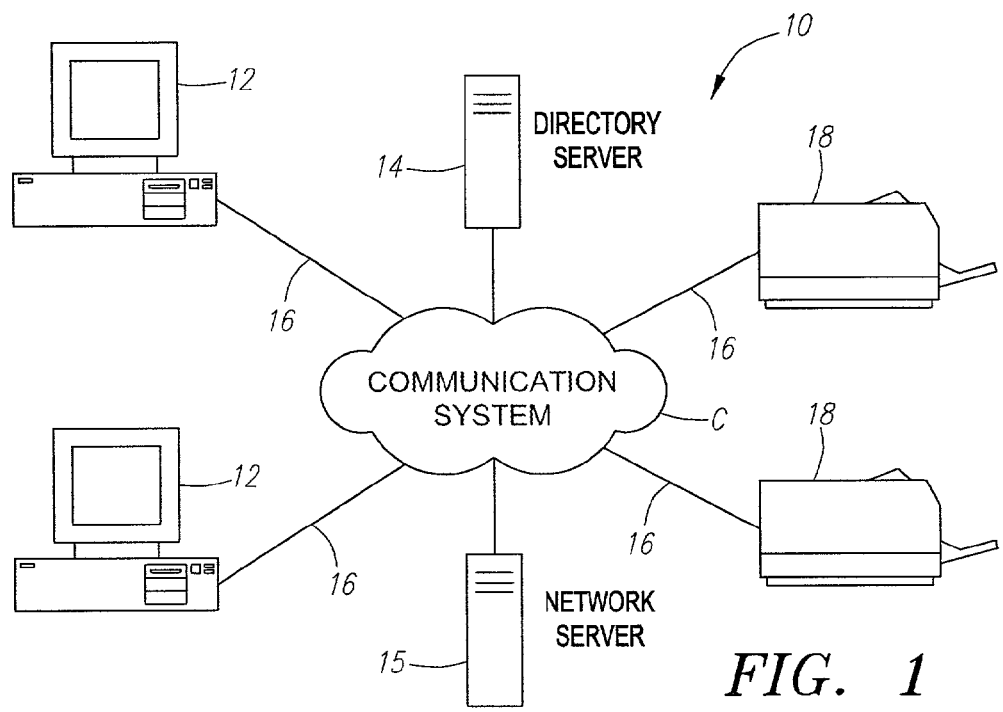
FIG. 1 is a simplified schematic illustration of a network in accordance with the present invention.

The detailed description that follows is presented largely in terms of processes and symbolic representations of operations performed by conventional computers and peripheral devices, such as file servers, printers and the like.

The computers and peripheral devices may advantageously contain program logic or other substrate configuration representing data and instructions, which cause the computers and peripheral devices to operate in a specific and predefined manner as, described herein. The program logic may advantageously be implemented as one or more modules. The modules may advantageously be configured to reside on memory in the computers and peripheral devices and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic is generally considered to be a sequence of processor-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those of ordinary skill in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be understood that manipulations within the processor are often referred to in terms of adding, comparing, retrieving, playing, moving, searching, transmitting and the like, which are often associated with manual operations performed by a human operator. It is to be understood that no involvement of the human operator may be necessary, or even desirable. The operations described herein are machine operations performed in conjunction with the human operator or user that interacts with the computers and peripheral devices.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM).

Throughout this description, the preferred embodiment and examples shown should be considered as exemplars, rather than limitations on the apparatus and methods of the present invention.

FIG. 1, is a simplified diagram of a network 10 in accordance with the invention. Network 10 may be a Local Area Network (LAN), wide area network (WAN), or other Electronic mail (E-mail) system, which may use a communication system C, such as the Internet. Network 10 can include one host computer 12 or workstation to a plurality of host computers or workstations, and one peripheral device 18 to a plurality of peripheral devices, coupled to one another via network communications lines 16. Network 10 may also include hubs, routers and other devices (not shown). The descriptions of host computer 12 and peripheral device 18 that follow are meant to describe all such computers and peripheral devices that may be found in network 10.

Figure 2:
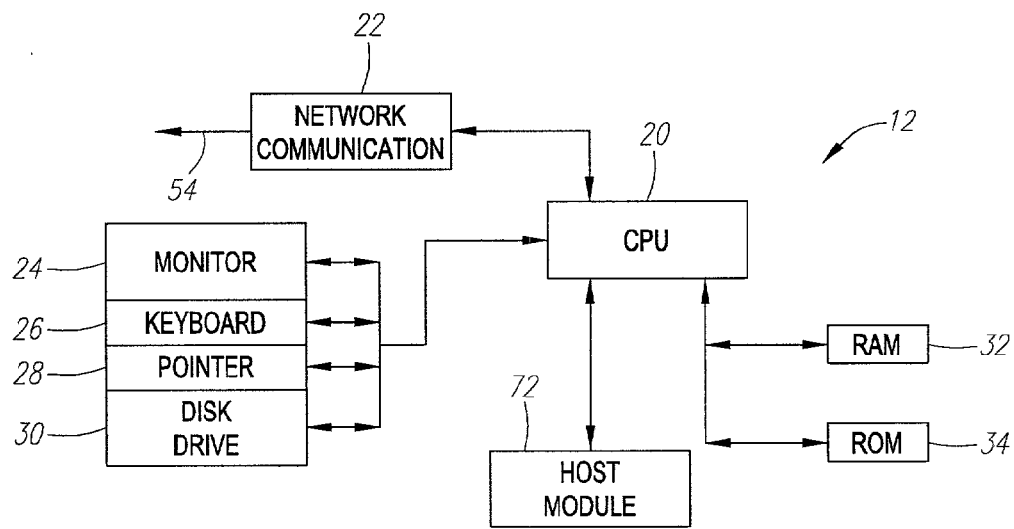
FIG. 2 is a simplified block diagram representing a host device in accordance with the present invention.

FIG. 2 is a simplified schematic diagram showing the internal functional architecture of host computer 12. Host computer 12 is typically a computer of the type that is well known by those of ordinary skill in the art. In one embodiment, computer 12 includes CPU 20 for executing computer-executable process steps. Host computer 12 may also include a display device 24, such as a monitor, a keyboard 26, a pointing device 28 and disk drive 30. Host computer 12 may advantageously be equipped with a network communication device 22, such as a network interface card, a modem, or other network connection device suitable for connecting to one or more networks.

Disk drive 30 stores operating system program files, application program files, and device drivers. A random access main memory ("RAM") 32 also interfaces to host computer 12 to provide CPU 20 with access to memory storage. When executing stored computer-executable process steps from disk drive 30 (or other storage media such as a floppy disk or World Wide Web (WWW) connection, CPU 20 stores those process steps in RAM 32 and executes the stored process steps out of RAM 32. Read only memory ("ROM") 34 is provided to store invariant instruction sequences, such as start-up instruction sequences or basic input/output operating system (BIOS) sequences for operation of keyboard 26.

Host computer 12 can execute an appropriate operating system, such as Linux, Unix, Microsoft® Windows® 95, Microsoft® Windows® 98, Microsoft® Windows® NT, Apple® MacOS®, IBM® OS/2®, and the like. Besides an operating system, host computer 12 can store application programs by which host computer 12 generates, manipulates, and stores files, and displays data in those files on monitor 24.

Figure 3:
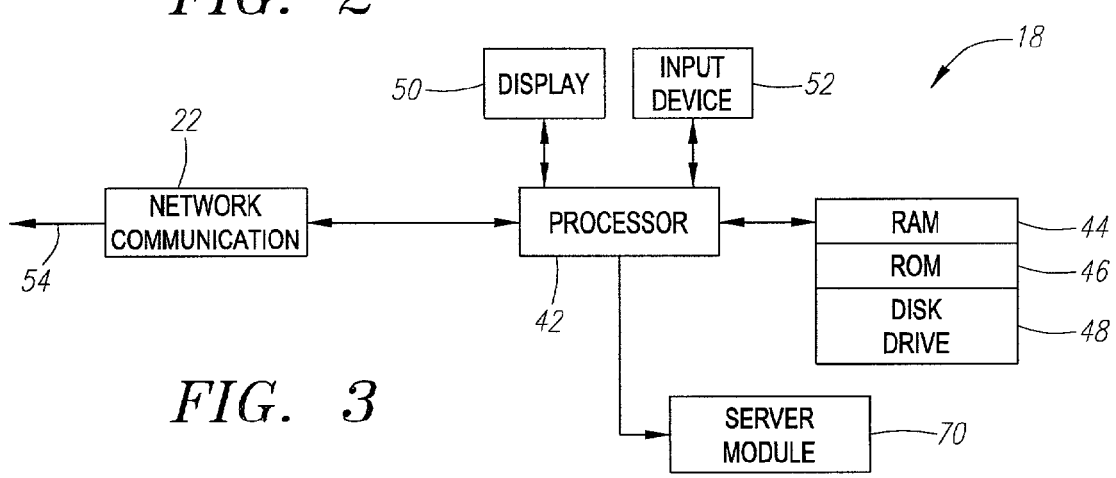
FIG. 3 is a simplified block diagram representing a peripheral device in accordance with the present invention.

FIG. 3 is a simplified block diagram illustration of an embodiment of peripheral device 18. Peripheral device 18 can include a printing function, memory, which can be used for storing print jobs and a panel, keyboard or the like, that allows a walk-up user to manually enter information into peripheral device 18. Peripheral device 18 can also include a network communication device 22 and control hardware and software interface for managing and printing the print jobs. Network communication device 22 enables communication via a communication path 54, which enables communication according to WWW protocols including the Hyper-Text Transfer Protocol (HTTP) protocol. The hardware can include a processor 42 and short term RAM memory 44, in which programs are run and stored, respectively, for controlling the functions of peripheral device 18. Peripheral device 18 can also include long term ROM memory 46 and a disk drive 48 for both long term and short term storage. Peripheral device 18 can also include standard components, such as a manual paper input area, an output tray, and a paper bin. Peripheral device 18 can include a fixed or a non-fixed display 50, such as an LCD, and a user input device 52, such as an alphanumeric keyboard or touch screen with keyboard emulator.

Peripheral device 18 has user interface software stored in ROM memory 46, which is responsible for displaying information on display 50 and interpreting user inputs from the user input device 52. In one embodiment, peripheral device 18 may be a printer, a copy machine capable of obtaining jobs from host computer 12 on network 10, and/or a multifunction peripheral device. An exemplary peripheral device 18, can be one of many types of printers available from the Hewlett-Packard Corporation of Palo Alto, Calif. An exemplary list of printers, may include HP LaserJet Models 4100, 4550, 2200, and 8550.

Referring now to FIGS. 2 and 3, in one embodiment, host computer 12 includes a host module 72. In one embodiment, host module 72 provides a first program 74 (FIG. 5), which includes logic for establishing the communication between host computer 12 and peripheral device 18 and which allows applications on CPU 20 (FIG. 2) to communicate with other programs, such as second program 76 described below.

First program 74 is a communication device that provides an interface between the operating system of host computer 12, or other applications, which allow execution of the print process. Generally, first program 74 includes logic that enables host module 72 to locate and load logic segments or files from second program 76. Optionally, first program 74 can be linked remotely with second program 76. In one embodiment, first program 74 provides interfaces related to rendering of the text, graphics, and images. For example, the interfaces in first program 74 can include logic that allows them to be linked with the functionality provided by a rendering module, described below, received from second program 76. As a result of this configuration, substantially the entirety of rendering occurs within the rendering module received from second program 76.

As mentioned, second program 76 provides rendering functionality and information elements or software elements for loading and installing into host computer 12. Included in second program 76, is rendering module 77, which includes logic to allow the performance of well known and well understood functions and processes relating to the displaying and manipulating of text, images, and other graphics, including the process of adding realism to computer graphics by adding three-dimensional qualities, such as shadows and variations in color and shade.

Second program 76 includes detailed knowledge about peripheral device 18 on which it resides. Thus, rendering module 77 can be configured to optimize the rendering process for the specific peripheral device 18 from which rendering module 77 was received.

Referring again to FIGS. 2 and 3, in one embodiment, peripheral device 18 can include a server module 70. In this embodiment, server module 70 provides web access functionality, which can be implemented with existing circuitry to provide access and control through a variety of communication devices. Server module 70 receives HTTP commands through the network communication device 22 along communication path 54. The HTTP commands specify one of a set of predetermined URLs for the peripheral device 18. For example, HTTP commands are generated in host computer 12 to perform file transfers via the communication path 54 to obtain a rendering module for loading into peripheral device 18 to be used in conjunction with native code in host computer 12.

To allow communication on path 54 between modules and/or devices, host module 72 can generate, for example, HTTP commands and transmit and receive them through network 10 via network communication device 22 and communication path 54. Host module 72 can be pre-loaded with a number of predetermined Universal Resource Locators (URLs), which correspond to the IP address of various peripheral devices 18 on network 10.

Optionally, a directory server 14 (FIG. 1) may be incorporated into network 10. Directory server 14 may include the URLs of various peripheral devices 18 located throughout network 10, and peripheral devices accessible over the WWW portion of the Internet. In this optional embodiment, host module 72 is pre-loaded with the URL of directory server 14. Directory server 14 can prompt host module 72 for information regarding the location of the desired peripheral device. For example, if a user desires to access peripheral device 18 by initiating a print job, directory server 14 can prompt the user to indicate the location at which the print job is to be completed. Once the location is specified, directory server 14 can send a list of URLs to host module 72, which correspond to the desired location.

In another option for obtaining URLs for specific peripheral devices 18, host module 72 can include a program to determine whether a specific IP address is accessible through network 10. In one embodiment, host module 72 transmits a multicast message designed to be heard by a select group of peripheral devices 18 connected, for example, to the same LAN. Host module 72 sends a packet to the specified multicast address and waits for a reply. Various peripheral devices 18 on the LAN configured to receive the multicast message, reply with their specific URL address. The user can then make a selection from the replying peripheral devices.

In yet another option for obtaining URLs for peripheral devices 18 in network 10, peripheral devices 18 can advertise or broadcast their existence in network 10. Typically, a service advertising protocol (SAP) can be employed in such a broadcast. A network server 15 (FIG. 1) running on network 10 gathers the SAP broadcast and captures the SAP into a network database. Host module 72 can peruse the network database when necessary to retrieve a listing of peripheral devices 18. The network database also provides information, such as the URLs, which can be used by host module 72 to directly communicate with peripheral devices 18 in accordance with the present invention.

Figure 4:
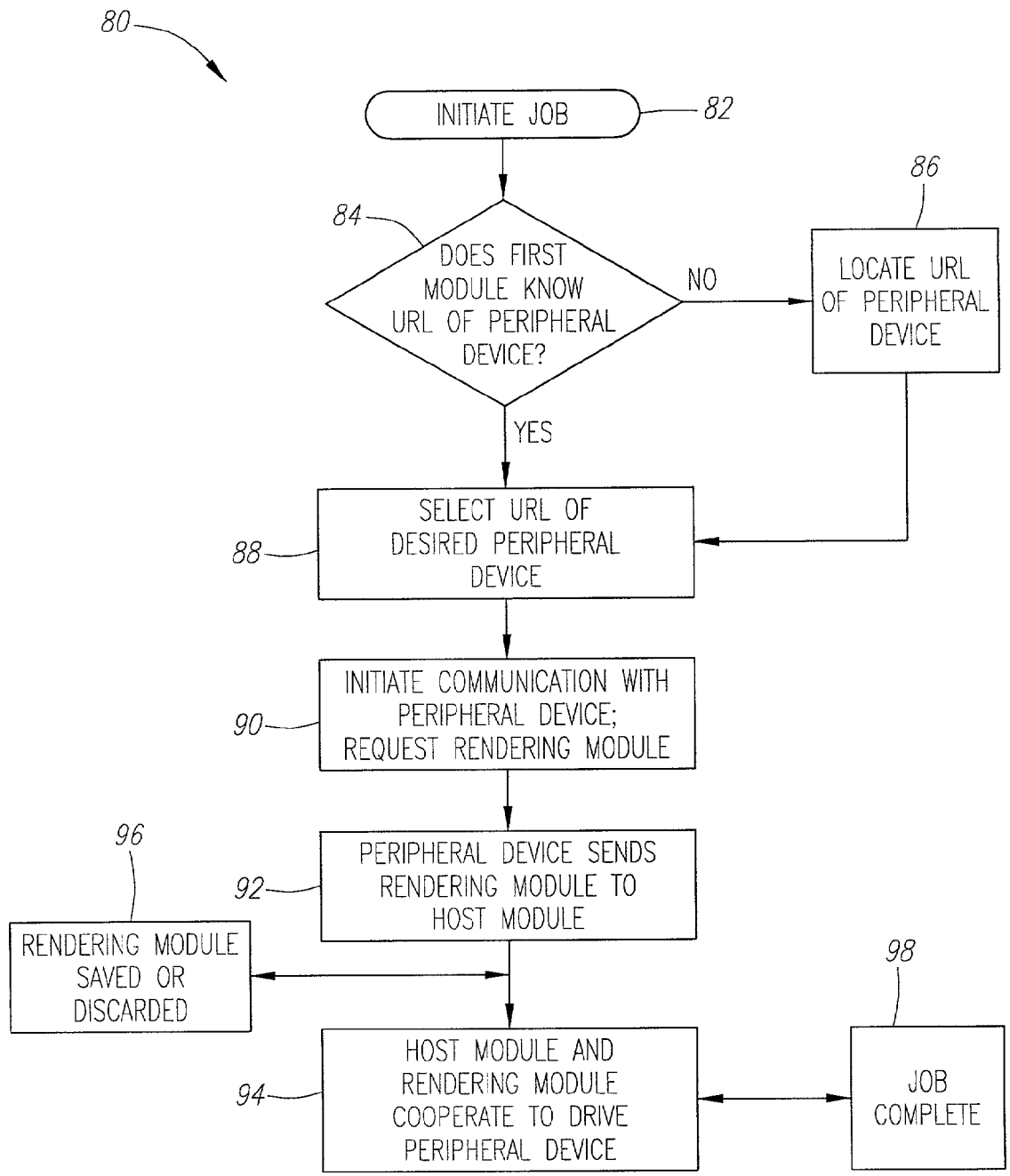
FIG. 4 is a flow diagram of a process in accordance with an embodiment of the present invention.

FIG. 4 is a flow diagram of a process 80 for transmitting a print job in accordance with the present invention. Printing is established at each host computer 12, (FIG. 2) in network 10 for all applications where printing is available, as an option, whenever the user initiates a job, for example, a print job (action 82) from his or her host computer 12. In action 84, host module 72 (FIG. 2) determines if URL information is available regarding peripheral devices 18 of interest in network 10. If no URL information exists, for example in memory 32 or disk drive 30 (FIG. 2), host module 72 can access directory server 14 (FIG. 1) or can attempt to multicast to locate peripheral devices 18 in network 10 (action 86) as described above. In this example, a list of URLs has been preloaded into host module 72, which correspond to peripheral devices 18 in network 10. In action 88, menu options are presented, which include the choice of selecting peripheral device 18 from among their pre-loaded corresponding URLs. Thus, in accordance with menu options, the user may select the desired peripheral device 18.

If a selection has been made, in action 90, host module 72 initiates the communication with server module 70 of the desired peripheral device 18. In action 90, host module 72 requests a rendering module 77 from second program 76.

Figure 5:
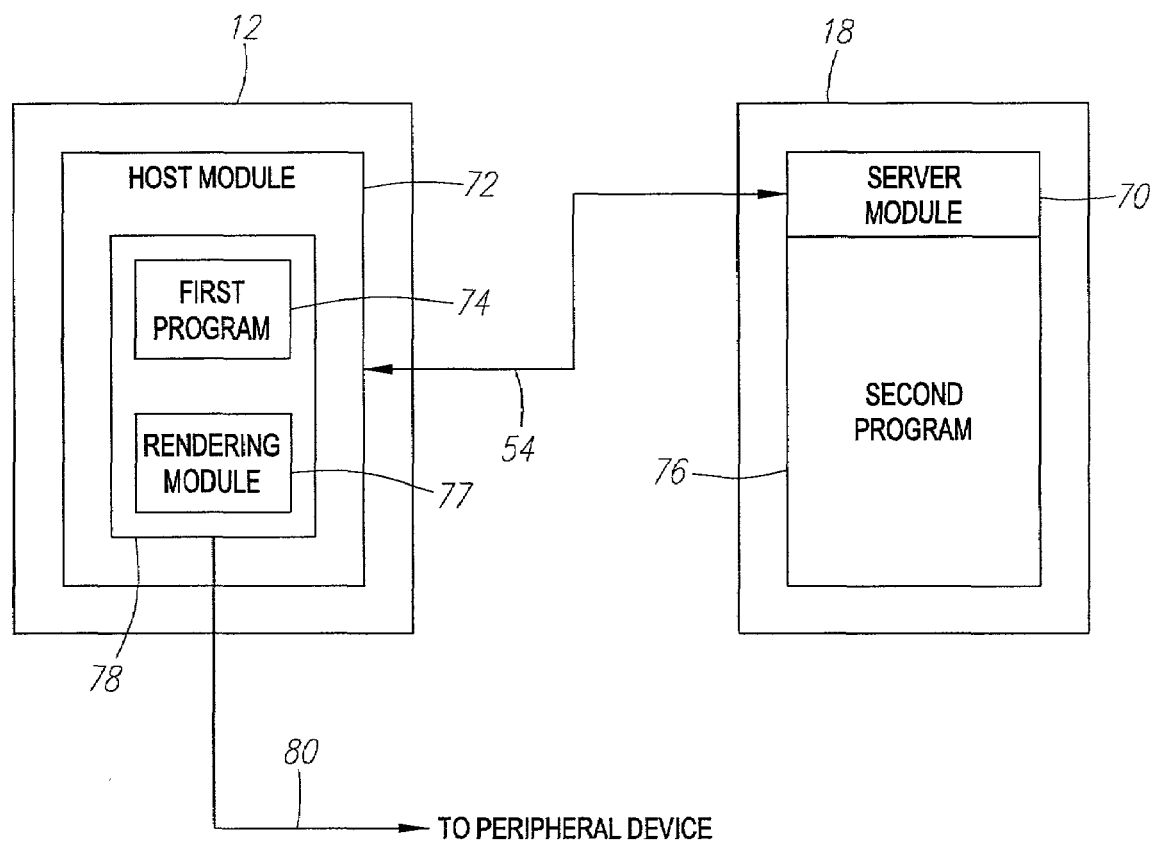
FIG. 5 is a simplified block diagram of an embodiment of the present invention.

In action 92, server module 70 loads and installs rendering module 77 into host module 72 in response to the request from host module 72 in action 90 (See FIG. 5).

Once the request is received from host module 72, rendering module 77 is transmitted via communication path 54 from second program 76 and then downloads each of elements specified in rendering module 77 into host module 72. If necessary, rendering module 77 updates a peripheral device configuration to reflect the newly installed elements for subsequent access to the desired peripheral device 18. Optionally, rendering module 77 can be configured to delete all information and software elements from host computer 12 upon completion of the print job (action 96).

In one embodiment, second program 76 can include a high level programming language, such as Java, which can be downloaded from server module 70 to host computer 12 in the form of Java applets, and run on a Java compatible browser, such as Netscape Navigator® or Microsoft Internet Explorer®.

Once rendering module 77 is downloaded in host computer 12, first program 74 and rendering module 77 work cooperatively to create a driver module 78 for providing the functions of a printer driver to control peripheral device 18 (action 94). For example, the dynamically created driver module 78 receives generic commands from an application running on CPU 20 (FIG. 2). Driver module 78 acts like a translator between host computer 12 and peripheral device 18. Driver module 78 receives the generic commands and translates them to a set of specialized commands that are only known by peripheral device 18, which responded to the request in action 90 (FIG. 4). In one embodiment, dynamically formed driver module 78 translates commands into specialized commands, such as a high level Printer Description Language File ("PDL file"). A well known PDL file is Hewlett-Packard Printer Control Language (PCL).

Once the commands are translated they can be made to drive peripheral device 18 via path 80, for example, to complete a print job (action 98).

While specific embodiments of this invention have been described, it is to be understood that these embodiments are illustrative and not limiting. Many additional embodiments that are within the broad principles of this invention will be apparent to persons skilled in the art.

What is claimed is:

1. A printing system comprising: a computer readable medium embodying a host module for initiating a communication from a host device, said host module having a first program; and a computer readable medium embodying a rendering module disposed in a printer, said rendering module including rendering functionality for said printer, logic for displaying text, and/or other graphics, and information about said printer and said rendering module being provided to said host device in response to said communication, said first program and said rendering module used cooperatively to control said printer.

2. The system of claim 1, wherein said host module enables loading of said rendering module into said host device.

3. The system of claim 1, wherein said host device comprises a computer.

4. The system of claim 1, wherein said printer includes a server module having a web access mechanism to provide a communication path for said communication.

5. The system of claim 4, further comprising a directory server, wherein said directory server provides an address for said host module to communicate with said server module.

6. The system of claim 1, wherein said rendering module is configured to optimize a rendering process for the specific printer from which said rendering module is provided.

7. The system of claim 1 wherein said host module and said rendering module are useable with each of a plurality of operating system environments.

8. The system of claim 1, wherein said host module for initiating a communication from a host device comprises a host module for initiating a communication from a host device in response to initiating a print job.

9. The system of claim 1, wherein said host module for initiating a communication from a host device comprises a host module for initiating a communication from a host device in response to initiating a print job and said rendering module being configured to delete said rendering functionality, said logic, and said information from said host device upon completion of said print job.

10. A printing system comprising: a computer readable medium embodying a host module for initiating a communication from a host device, said host module having a first program; and a computer readable medium embodying a rendering module disposed in a printer, said rendering module including a second program for displaying text, and/or other graphics and said rendering module being provided to said host device in response to said communication, said first program and said second program used cooperatively to control said printer.

11. The system of claim 10, wherein said host module enables loading of said rendering module into said host device.

12. The system of claim 10, wherein said host device comprises a computer.

13. The system of claim 10, wherein said printer includes a server module having a web access mechanism to provide a communication path for said communication.

14. The system of claim 10, wherein said host module for initiating a communication from a host device comprises a host module for initiating a communication from a host device in response to initiating a print job.

15. The system of claim 10, wherein said host module for initiating a communication from a host device comprises a host module for initiating a communication from a host device in response to initiating a print job and said rendering module being configured to delete said second program from said host device upon completion of said print job.

16. A method for dynamically creating a driver comprising:
    initiating a communication from a computer to a printer, said including a first program logic;
    receiving a response to said communication, said response including a second program logic for displaying text, images and/or other graphics; and
    driving said printer cooperatively using said first program logic and said second program logic.

17. The method of claim 16, further comprising initiating a print job and wherein initiating a communication from a computer to a printer comprises initiating a communication from the computer to the printer in response to initiating the print job.

18. The method of claim 16, further comprising:
    initiating a print job, wherein initiating a communication from a computer to a printer comprises initiating a communication from the computer to the printer in response to initiating the print job; and
    deleting said second program logic from said computer upon completion of said print job.

* * * * *

UNITED STATES PATENT AND TRADEMARK OFFICE
CERTIFICATE OF CORRECTION

PATENT NO. : 7,202,961 B2 Page 1 of 1
APPLICATION NO. : 09/871751
DATED : April 10, 2007
INVENTOR(S) : Elliot Lee Klosterman It is certified that error appears in the above-identified patent and that said Letters Patent is hereby corrected as shown below:

In column 8, line 27, in Claim 16, after "said" insert -- computer --.

Signed and Sealed this

Ninth Day of September, 2008

JON W. DUDAS
*Director of the United States Patent and Trademark Office*